United States Patent Office 2,937,278
Patented May 17, 1960

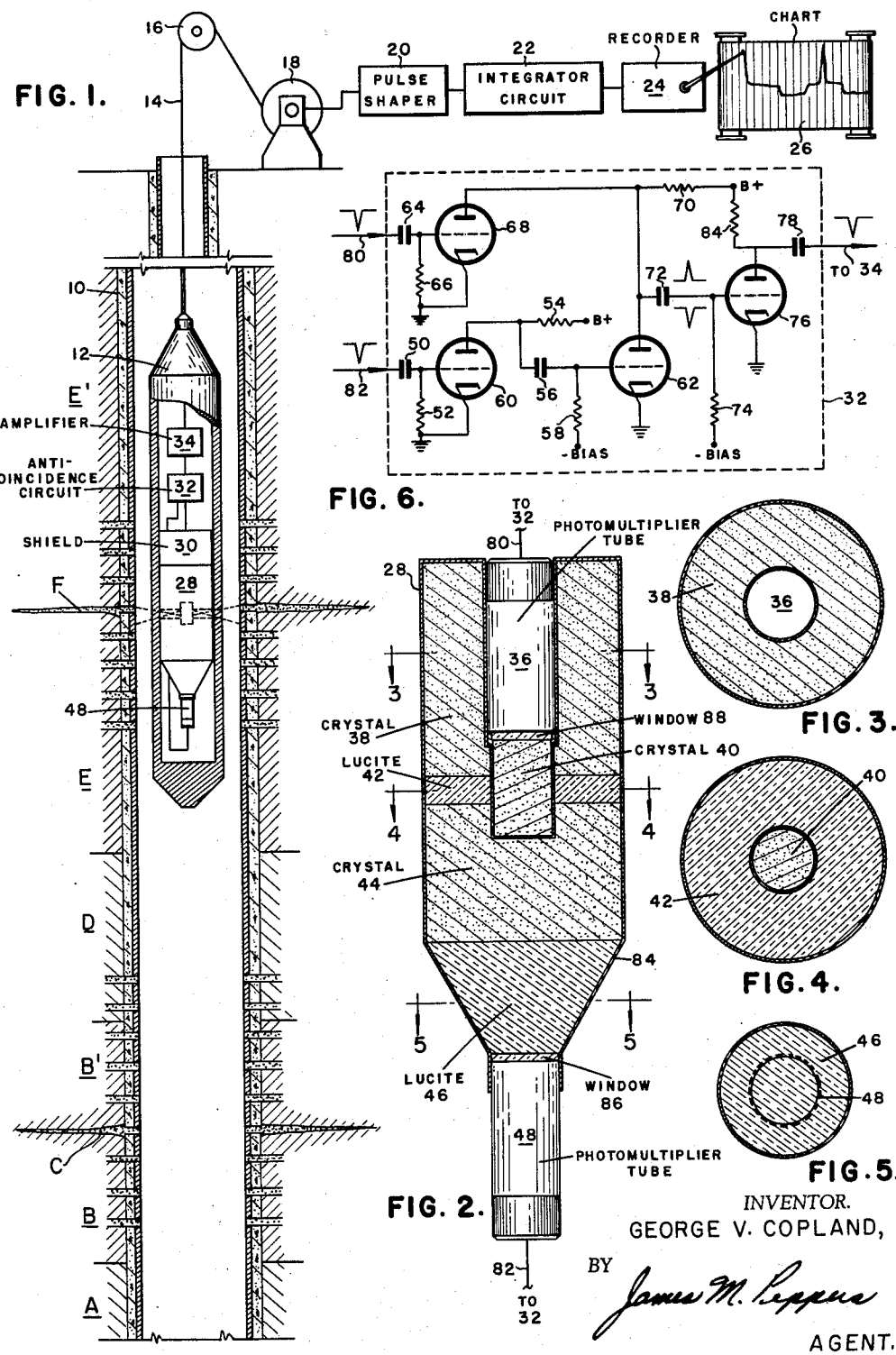

2,937,278

DIRECTIONAL SCINTILLATION WELL LOGGING APPARATUS

George V. Copland, Duncan, Okla., assignor, by mesne assignments, to Welex, Inc., a corporation of Delaware Application March 20, 1957, Serial No. 647,292

12 Claims. (Cl. 250—11)

This invention generally relates to apparatus for the radioactive logging of well bores and more particularly relates to apparatus for detection of thin horizontal beds of well formation which have different radioactive properties than adjacent beds.

During the past few years radioactive logs of bore holes have been adopted by the oil industry as another means for gaining information regarding the nature of penetrated earth formations not otherwise readily obtainable. Various types of radiation detectors have been provided for such logging equipment. Generally detectors such as the commonly used Geiger-Mueller type have been so provided which detect all the radiation emanating in proximity to the logging tool. Thus, when logging a well bore which traverses formations of various radioactivity, such detectors would indicate such radioactivity independent of the direction from whence it came.

When searching for thin horizontal beds of formations, such detectors therefore can not indicate the actual thickness of such beds to any closer definition than dimensions influenced by the physical size of such detectors and the range of influence of the formation. In actual practice with present equipment, it has been found that thickness definition of beds of less than about eighteen inches is not possible. This inability has been especially realized in the method of detecting the scope of hydraulic fractures in well formations in which a radioactive tracer has been added to the propping aggregate.

This fracturing method, coming into predominant use, is disclosed in commonly assigned patent application, Serial No. 538,606, filed October 5, 1955, by R. G. Mihram et al., entitled "Method of Locating Fractures by Radioactive Sand." In practicing this method, a radioactive log is generally made of the well formation prior to a fracturing operation. After the well has been fractured and a radioactive propping aggregate injected therein, a second radioactive log is made of the well formation. Upon comparison of these preliminary and subsequent logs, the location of the radioactive aggregate is readily apparent.

However, it is desired to not only determine the location of such fractures but also to determine their relative thickness and number.

It is well known that directional effects can be provided for radiation detectors by provision of heavy metal shields such as lead or tungsten. However, to provide such shields in a well logging tool, it would be necessary to make the tool unduly large in diameter. As a practical matter such tools would not be suitable for logging well bores of small diameter or logging well bores through lengths of small diameter pipe.

It is therefore the general objects of this invention to provide apparatus of highly directional radiation detection ability and have such directional apparatus readily adaptable to be incorporated into radioactivity well logging tools of present diameter.

Briefly described, this invention provides a novel directional detector of penetrative radiation consisting of a first scintillation means capable of converting said radiation into light. This first scintillation means is confined within an opaque covering and has a first photoelectric means, responsive to light, connected in close, light transmitting coupling therewith such that said first photoelectric means is responsive only to said first scintillation means. A second scintillation means, confined within an opaque covering and connected in close light transmitting coupling with a second photoelectric means, substantially encloses all of said first scintillation detection means excepting an exposure directed to a desired preselected field of investigation adjacent to said detector. Said second scintillation means is adapted to be responsive to any penetrative radiation in the environment of said detector. Said first scintillation detection means is adapted to be directly responsive only to that portion of said radiation emanating from said preselected field. An electrical selection means is provided which is adapted to select the sole electrical output of said first photoelectric means, to cancel concurrent electrical outputs of both said photoelectric means and to cancel the sole electrical output of said second photoelectric means.

Other objects and advantages of this invention will become more apparent by consideration of the following specific description taken in view of the attached drawing.

In the drawing:

Figure 1 generally illustrates the invention provided in a radioactivity well logging tool which is suspended in a well bore.

Figure 2 is a longitudinal cross section illustrating in greater detail the scintillation arrangement provided in Figure 1.

Figure 3 is a cross section of the scintillation arrangement of Figure 2 as taken at section 3—3.

Figure 4 is a cross section of the scintillation arrangement of Figure 2 as taken at section 4—4.

Figure 5 is a cross section of the scintillation arrangement of Figure 2 as taken at section 5—5.

Figure 6 is a schematic illustration of the anticoincidence detection circuit provided in Figure 1.

Now, referring to the drawing in detail and first to Figure 1, there is illustrated a radiation detection tool 12 supported by a logging cable 14 from a sheave 16. Cable 14 is adapted to pass over sheave 16 and be taken up or payed out from a hoisting drum 18. Hoisting apparatus (not shown) is provided to rotate drum 18 at any speed desired to accomplish a preselected rate of displacement of tool 12 through well bore 10. Motion transmitting equipment is also provided at sheave 16 (not shown) to displace a logging chart 26 in definite proportion to the position of tool 12 in well bore 10. A preferred example of such equipment is a "Selsyn" transmitter and receiver assembly.

Housed within tool 12 is a directional radiation detection assembly 28, hereinafter described in detail, the outputs of which are fed into an anticoincidence circuit 32. The output of circuit 32 is fed through an amplifier 34, cable 14, and a brush and slip ring assembly on drum 18 to a pulse shaping circuit 20. The output of pulse shaping circuit 20 feeds into an integrator circuit 22. Circuit 22 generates a D.C. output in proportion to the rate of pulses from tool 12. The D.C. output of integrator circuit 22 feeds into a recorder pen drive circuit 24. Pen drive circuit 24 displaces a pen across logging chart 26 in proportion to the voltage received from circuit 22.

Supported above detection assembly 28 is a radiation shield 30 which has been conveniently provided for supplementary shielding of detection assembly 28, as later described. It is pointed out that provision of shield 30, as illustrated, does not require increase in diameter of tool 12 and that the addition in length of tool 12 required by insertion of shield 30 is not of importance.

Referring to Figure 2, there is illustrated in longitudinal cross-section a radiation detection assembly 28 embodiment provided by this invention. As illustrated, a radiation detection scintillator 40 is provided in close light transmitting coupling with a photomultiplier tube 36. Scintillator 40 is generally cylindrical in shape and provided with a light opaque coating on all surfaces not in coupling with tube 36. Surrounding scintillator 40 is an annular member 42 of light transmitting and non-scintillating material, herein exampled as "Lucite." Member 42 jointly serves as a light pipe and a non-scintillating window, through which penetrative radiation, such as gamma rays, reach scintillator 40 in direct line from without the assembly. Abutting pipe 42 and surrounding photomultiplier tube 36 and a portion of scintillator 40 is a shielding scintillator 38.

Further illustration is provided in Figure 3 which shows shielding scintillator 38 and photomultiplier tube 36 in a cross section taken at 3—3 of Figure 2.

Figure 4 shows scintillator 40 and light pipe 42 in a cross section taken at 4—4 of Figure 2.

As provided, scintillator 38 is provided with a light opaque coating on all surfaces not in light transmitting coupling with light pipe 42. Also abutting light pipe 42 and encompassing a portion of scintillator 40 is a second shielding scintillator 44. Abutting scintillator 44 on its other end is a second non-scintillating light pipe 46, provided in the shape of an inverted truncated cone. In Figure 5 there is shown light pipe 46 and location of multiplier 48 in a cross section taken at 5—5 in Figure 2. All surfaces of scintillator 44 not abutting light pipe 42 or light pipe 46 are provided with a light opaque coating. A photomultiplier tube 48 is provided in close light transmitting coupling with light pipe 46.

As can be seen, shielding scintillator 38, light pipe 42, scintillator 44 and light pipe 46 provide a common scintillation element as seen by photomultiplier tube 48. Therefore, any radiation causing scintillation of scintillator 38 or 44 will actuate tube 48 but will not actuate tube 36 due to provision of the light opaque coatings. Also, it is seen that any scintillation of scintillator 40 caused by penerative radiation passing through light pipe 42 will actuate tube 36 but not tube 48. It is further seen that any radiation penetrating assembly 28 from such direction that scintillation is caused in both scintillator 40, and either of scintillators 38 or 44, will cause concurrent actuation of both tubes 36 and 48.

For convenience and economy of construction, the shielding scintillation system consisting of scintillator 38, light pipe 42, scintillator 44 and light pipe 46 is herein provided as an integral unit contained in a light opaque container 84. Though container 84 could be of varied materials to provide light opaque and moisture proof qualities, use of aluminum has been found to be of utility and is herein exampled. To completely contain the previous mentioned elements and yet provide close light transmitting coupling with tube 48, a light transmitting window 86 is provided in container 84 intermediate light pipe 46 and tube 48.

Scintillator 40, as herein provided, is also contained in container 84. A window 88 is also provided in container 84 and intermediate scintillator 40 and tube 36.

It is seen that penetrative radiation from a directional axial to scintillator 40 might pass though phototube 36 without actuation of tube 48 by scintillator 38 and thus actuate tube 36 by scintillator 40. For this reason the lead shielding member 30 has been provided. Again, such shielding member is provided for convenience and economy in manufacture of detection assembly 28; it being obvious that scintillator 38 could be provided to also encompass tube 36 and be scintillated by such radiation.

Scintillators 38, 40, and 44 may be provided of either crystalline or liquid material. For example, liquid scintillators such as P-terphenyl in xylene could be provided as illustrated with corresponding opaque and light transmitting surfaces. Also, crystalline scintillators such as anthracene, naphthalene, or sodium iodide containing thallium may be provided. Though anthracene and naphthalene crystals have an advantage over sodium iodide in that they are not hygroscopic, the sodium iodide crystal is preferred and herein illustrated because of superior scintillating efficiency upon exposure to radiation.

Tube 36 is connected into anti-coincidence circuit 32 by means of electrical connection 80. Tube 48 is connected into circuit 32 by means of electrical connection 82. Referring to Figures 1 and 6, photomultiplier tube 48 is connected through connection 82 and a capacitor 50 to the grid of a triode 60. Also, the grid of tirode 60 is connected through a resistor 52 to ground and the cathode of triode 60 is connected directly to ground. The plate of triode 60 is connected through a resistor 54 to a B+ source (not shown) and through a capacitor 56 to the grid of a triode 62. The grid of triode 62 is connected through a resistor 58 to a minus biasing voltage (not shown) and the cathode of triode 62 is connected to ground.

Photomultiplier tube 36 is connected into circuit 32 by means of connection 80 through a capacitor 64 to the grid of a triode 68. The grid of triode 68 is connected through a resistor 70 to a B+ source (not shown). The plates of both triodes 68 and 62 are commonly connected through a capacitor 72 to the grid of a triode 76 which is connected through a resistor 74 to a source of minus biasing voltage (not shown). The plate of triode 76 is connected through a capacitor 78 into amplifier 34 and through a resistor 84 to said B+ source.

In operation, tool 12 is usually lowered in well bore 10 to below the earth formations to be measured and then raised past the formations. While being raised a record is made on logging chart 26 of the relative radioactivity of the formation traversed.

In comparing the record appearing on chart 26 with the formations A, B, D, and E of Figure 1, it is seen that each formation presents a different level of radioactivity to tool 12. It is also seen that the extremely thin formations C and F, herein exampled as hydraulic fractures containing a radioactive propping aggregate, are clearly and sharply defined by the improved apparatus provided by this invention.

As tool 12 passes a particular section of formation, the radiation therefrom penetrates both the shielding scintillating assembly monitored by tube 48 and the detecting scintillator 40 monitored by tube 36. As is known, the radiation encountered by a scintillating element may be absorbed by such element and create a light scintillation. Such radiation may also scatter upon initial collision (Compton effect), and create a first and subsequent scintillations until its energy is absorbed, or such radiation could possibly penetrate such crystal without collision and cause no scintillation. However, there is usually very high probability that the radiation will be absorbed, or at least cause some scintillation in the case of Compton scatter.

Thus it is seen that radiation encountering detection assembly 28 may encounter shielding scintillator 38, detecting scintillator 40 through light pipe 42, or shielding scintillator 44. If the radiation encounters shielding scintillator 38, it is most likely to cause a scintillation therein and be absorbed. However, in the case of Compton scatter, such radiation could cause a scintillation in both shielding scintillator 38 and detection scintillator 40. The same holds true for shielding scintillator 44 in relation to detection scintillator 40. Thus it is seen that if penetrative radiation scintillates either detection scintillator 38 or 44, that tube 48 will be singly actuated thereby. If, in the case of Compton scatter, either of shielding scintillators 38 or 44, and detection crystal 40 are scintillated concurrently, both of tubes 36 and 48 will be concurrently actuated. It is also seen that radiation entering light pipe 42 and causing detection scintillator 40 to singly scintillate will cause single actuation of tube 36. It is therefore seen that either tube 36 or 48 may be singly actuated or concurrently actuated.

Upon scintillation of either of shielding scintillators 38 or 44, photomultiplier tube 48 is actuated and sends a negative pulse through connection 82 to circuit 32. Upon scintillation of detection scintillator 40, photomultipler tube 36 is actuated and sends a negative pulse through connection 80 to circuit 32. Referring to Figure 6, a negative pulse received through connection 80 to the grid of triode 68 shuts said triode off, creating a positive pulse on the plate thereof which feeds through capacitor 72 to the grid of triode 76. Triode 76, normally cut off by a minus voltage bias on its grid, suddenly goes positive, causing triode 76 to conduct during such positive period. A negative pulse is thereby passed through capacitor 78 to amplifier 34 for subsequent shaping by circuit 20 and integrating by circuit 22.

Photomultiplier tube 48, upon actuation in response to scintillation of detection scintillator 38 or 44, sends a negative pulse through connection 82 and capacitor 50 to the grid of triode 60. Triode 60 thereon cuts off, sending a positive pulse through capacitor 56 to the grid of triode 62. Triode 62, normally cut off by the minus biasing voltage, conducts, sending a negative pulse through capacitor 72 to the grid of triode 76. Triode 76, normally cut off by the minus biasing voltage through resistor 74, is unaffected thereby.

It is now seen that concurrent negative pulses appearing from tubes 36 and 48 will cause concurrent and opposing pulses to appear at the grid of triode 76. In such case the grid voltage of triode 76 will remain substantially unchanged causing said triode to remain cut off, as normally provided.

It is also seen that a single negative pulse appearing from tube 36 will cause circuit 32 to generate a corresponding negative pulse through amplifier 34 to the earth's surface. Concurrent pulses from tubes 36 and 48 will be cancelled, and a single negative pulse generated by tube 48 will be cancelled.

Thus, the only radiation indicated by tool 12 is that radiation causing single scintillation of detection scintillator 40. Such radiation is essentially that transmitted directly through light pipe 42 to said detection scintillator. Any radiation concurrently causing scintillation of scintillator 40 and either of scintillators 38 or 44 will be cancelled as well as any radiation causing single scintillation of scintillators 38 or 44.

It is further seen any radiation available to detection scintillator 40 through the cylindrical opening occupied by tube 36 is effectively blocked by provision of shielding member 30. Also seen is that, if it were desired, shielding scintillator 38 could be provided to encompass this avenue to scintillator 40 and obviate the need for member 30. However, since the critical dimension of tool 12 is in diameter rather than length, it is found more convenient and economical to provide the scintillators in the simple geometrical shapes illustrated.

For the previously described alternate scintillation materials, some alternate construction could be provided. For example, if the liquid scintillation material were used, the present scintillating members 38, 40 and 44 would be provided as separate containers of the same configuration and have appropriate light transmitting windows for light transmitting contact with light pipes 42 and 46 and tubes 36 and 48.

It is pointed out that other light transmitting materials may be provided for light pipes 42 and 46 than the previously exampled Lucite. For example, non-scintillating liquids of appropriate refraction index, such as Dow Corning No. 200 silicone fluid, may be provided. Such liquids may be used with utility when their radiation absorption properties are sufficiently low.

Also pointed out is that light pipe "window" 42, if provided as an air space, would also be of utility in detection assembly 28. However, in such cases a third photomultiplier tube would need be provided in close light transmitting coupling with shielding scintillator 38 and be commonly connected with photomultiplier tube 48 for operation in circuit 32. In such case tube 48 would remain in close optical coupling with shielding scintillator 44.

As previously mentioned, penetrative radiation such as gamma rays causes scintillation in such scintillators only because it looses energy therein, e.g., it produces electrons by either the photoelectric or Compton effect. It has been mentioned as possible that radiation could penetrate the outer shielding scintillator without losing such energy and subsequently cause scintillation in the detection scintillator 40. It is pointed out that, though possible, the incident probability of this is extremely low. It is also seen that concurrent scintillation of the shielding and detecting scintillators due to Compton scattering is nulled by anti-coincidence circuit 32 and, though the over-all counting rate may be lower, will cause no spurious indication of radioactivity variation.

It is obvious that the tool as herein disclosed may be operated with conventional radioactivity detection tools and may be used to complement the results obtained with such tools. For example, the high counting rate of conventional Geiger-Mueller counters could be used to initially log the well bore. For correlation and more definitive information at particular zones of interest, for example extremely thin formation beds or hydraulic fractures, inspection of such formations could be repeated by a tool 12 also containing the illustrated invention.

It is apparent that other modifications and variations of the present invention, as herein described, may be made without departing from the spirit and scope thereof, and therefore limitations should be imposed only as are indicated in the appended claims.

That being claimed is:

1. A radioactivity logging system for well bores, comprising; a radiation detection means adapted to produce an electrical effect in response to penetrative radiation emanating from a preselected cylindrical area of said well bore wall, said detection means having a first scintillator means, capable of converting said penetrative radiation into light scintillation, coupled to a first photoelectric means in light transmitting coupling, said first photoelectric means adapted to produce an electrical effect upon scintillation of only said first scintillator means, a second scintillator means, capable of converting said penetrative radiation into light scintillation, encompassing a portion of said first scintillator means, a third scintillator means, capable of converting said penetrative radiation into light scintillation, encompassing another portion of said first scintillator means, a non-scintillating radiation and light transmitting means, encompassing the remainder of said first scintillator means, adapted to provide a non-scintillating path for penetrative radiation emanating from said selected area of said well bore wall, and a second photoelectric means coupled in close light transmitting coupling with said second and said third scintillator means to produce an electrical effect in response to light scintillation produced only by said second and said third scintillator means; electrical selection means adapted to select the single electrical effect of said first photoelectric means, to reject concurrent electrical effects of both said photoelectric means, and to reject the single electrical effect of said second photoelectric means; and transmission means to transmit such selected electrical effects to an indication and recording means.

2. A radioactivity logging system for well bores, comprising; a radiation detection means adapted to produce an electrical effect in response to penetrative radiation emanating from a preselected area of said well bore wall, said detection means having a first scintillator means, capable of converting said penetrative radiation into light scintillation, coupled to a first photoelectric means adapted to produce an electrical effect upon scintillation of only said first scintillator means, a second scintillator means, capable of converting said penetrative radiation into light scintillation, substantially enclosing said first scintillator means, said second scintillator means including a non-scintillating radiation transmitting means, exposing a portion of said first scintillator means, adapted to provide a non-scintillating path for penetrative radiation emanating from said selected area of said well bore wall and directed to said first scintillator means, and a second photoelectric means coupled in close light transmitting coupling with said second scintillator means to produce an electrical effect in response to light scintillation produced only by said second scintillator means; electrical selection means adapted to select the single electrical effect of said first photoelectric means, to reject concurrent electrical effects of both said photoelectric means, and to reject the single electrical effect of said second photoelectric means; and transmission means to transmit such selected electrical effect to an indication and recording means.

3. A radioactivity logging system for well bores, comprising; a radiation detection means adapted to produce an electrical effect in response to penetrative radiation emanating from a preselected area of said well bore wall, said detection means having a first scintillator means coupled to a first photoelectric means in light transmitting coupling, said first photoelectric means adapted to produce an electrical effect upon scintillation of only said first scintillator means, a second scintillator means enclosing a portion of said first scintillator means, a third scintillator means enclosing another portion of said first scintillator means, a non-scintillating radiation transmitting means enclosing the remainder of said first scintillator means, said non-scintillating means adapted to provide a path for penetrative radiation emanating from said selected area of said well bore wall, and a second photoelectric means, coupled in close light transmitting coupling with said second and said third scintillator means, adapted to produce an electrical effect in response to light scintillation produced only by said second and said third scintillator means; electrical selection means adapted to select the single electrical effect of said first photoelectric means, to reject concurrent electrical effects of both said photoelectric means, and to reject the single electrical effect of said second photoelectric means; and transmission means to transmit such selected electrical effect to an indication and recording means.

4. A radioactivity logging system for well bores, comprising; a radiation detection assembly adapted to produce an electrical effect in response to penetrative radiation emanating from a preselected cylindrical area of said well bore wall, said detection means having a first scintillator means coupled to a first photoelectric means in light transmitting coupling, said first photoelectric means adapted to produce an electrical effect upon scintillation of only said first scintillator means, a second scintillator means substantially enclosing said first scintillator means, a non-scintillating radiation transmitting means exposing a portion of said first scintillator not enclosed by said second scintillator means for providing a path for penetrative radiation emanating from said selected area of said well bore wall and directed toward said first scintillator means, a second photoelectric means coupled in close light transmitting coupling with said second scintillator means to produce an electrical effect in response to light scintillation produced only by said second scintillator means; electrical selection means adapted to select the single electrical effect of said first photoelectric means, to reject concurrent electrical effect of both said photoelectric means, and to reject the single electrical effect of said second photoelectric means; and transmission means to transmit such selected electrical effect to an indication and recording means.

5. A system for directional logging of penetrative radiation in a well bore, the combination comprising; a first scintillator means, capable of converting said penetrative radiation into light scintillation, confined within a container opaque to light; a first photoelectric means, adapted to produce an electrical effect in response to light scintillation, connected in close light transmitting coupling with said first scintillator means, said first photoelectric means being responsive only to scintillation from said first scintillator means; a second scintillator means, capable of converting said penetrative radiation into light scintillation, confined with a container opaque to light and enclosing said first scintillator means, said second scintillator means adapted to be responsive to any penetrative radiation in the environment of said system excepting that portion of said radiation emanating from a preselected area of well bore wall directed to said first scintillator means through a non-scintillating window included in said second scintillator means; a second photoelectric means, adapted to produce an electrical effect in response to light scintillation, connected in a close light transmitting coupling with said second scintillator means; and electrical selection and indication means, adapted to select and indicate the single electrical effect of said first photoelectric means, to reject concurrent electrical effects of both said photoelectric means, and to reject the single electrical effect of said second photoelectric means.

6. A system for directional logging of penetrative radiation in a well bore, the combination comprising; a first scintillator means confined within a container opaque to light; a first photoelectric means connected in close light transmitting coupling with said first scintillator means, said first photoelectric means being responsive only to said first scintillator means; a second scintillator means confined within a container opaque to light and enclosing said first scintillator means, said second scintillator means adapted to be responsive to any penetrative radiation in the environment of said system excepting that portion of said radiation emanating from a preselected area and directed to said first scintillator means through a non-scintillating path included in said second scintillator means; a second photoelectric means connected in close light transmitting coupling with said second scintillator means; and electrical selection and indication means, adapted to select and indicate the single electrical indication of said first photoelectric means, to reject concurrent electrical indications of both said photoelectric means, and to reject the single electrical indication of said second photoelectric means.

7. A system for directional logging of penetrative radiation in a well bore, the combination comprising; a first scintillator; a first photoelectric means connected in close light transmitting coupling with said first scintillator, said first photoelectric means being responsive only to said first scintillator; a second scintillator enclosing said first scintillator, said second scintillator adapted to be responsive to any penetrative radiation in the environment of said system excepting that portion of said radiation emanating from a preselected direction and directed to said first scintillator through a non-scintillating window defined in said second scintillator; a second photoelectric means connected in a close light transmitting coupling with said second scintillator; and electrical selection and indication means adapted to select and indicate the single electrical output of said first photoelectric means, to reject concurrent electrical outputs of both said photoelectric means, and to reject the single electrical output of said second photoelectric means.

8. A system for directional logging of penetrative radiation in a well bore, the combination comprising; a first scintillator; a first photoelectric means connected in light transmitting coupling with said first scintillator, said first photoelectric means responsive only to scintillation from said first scintillator; a second scintillator enclosing said first scintillator, said second scintillator adapted to be responsive to any penetrative radiation in the environment of said system excepting that portion of said radiation emanating from a preselected area and directed to said first scintillator through a non-scintillating path defined through said second scintillator; a second photoelectric means in light transmitting coupling with said second scintillator; and electrical selection means adapted to select the single indication of said first photoelectric means, to reject concurrent indications of both said photoelectric means, and to reject the single indication of said second photoelectric means.

9. A system for directional detection of penetrative radiation within a well bore, the combination comprising; a first radiation detection means including a scintillating material confined within a container opaque to light for creating an electrical effect in response to reception of radiation; a second radiation detection means including a scintillating material separately confined within a container opaque to light substantially enclosing said first detection means for creating an electrical effect in response to reception of radiation; said second detection means including a transmission passageway not responsive to radiation exposing a portion of said first detection means for providing a path for radiation emanating from a preselected area of said well bore wall and directed toward said first detection means; and electrical selection and indication means for selecting and indicating the sole electrical effect of said first detection means, for rejecting concurrent electrical effects of both said detection means, and for rejecting the sole electrical effect of second detection means.

10. In well logging radiation detection means adapted to produce an electrical effect in response only to penetrative radiation emanating from a preselected area of said well bore wall; a first penetrative radiation detection means including a crystalline material for creating an electrical effect in response to penetrative radiation; a second penetrative radiation detection means including a crystalline material substantially enclosing said first detection means for creating an electrical effect in response to penetrative radiation; said second detection means including a radiation transmitting window exposing a portion of said first detection means for providing a non-responsive path through said second detection means for penetrative radiation emanating from said selective area of said well bore wall and directed to said first detection means; and an electrical selection means adapted to select the single electrical effect of said first detection means, to reject concurrent electrical effects of both said detection means, and to reject the single electrical effect of said second detection means.

11. A system for directional detection of penetrative radiation within a well bore, the combination conmprising; a first penetrative radiation detection means including a scintillating material for creating an electrical effect in response to reception of radiation; a second penetrative radiation detection means including a scintillating material substantially enclosing said first detection means for creating an electrical effect in response to radiation; said second detection means including a radiation transmission window not responsive to penetrative radiation exposing a portion of said first detection means for providing a path for penetrative radiation emanating from a preselected area of said well bore wall and directed toward said first detection means; and electrical selection means for selecting and indicating the sole electrical effect of said first detection means, for rejecting concurrent electrical effects of both said detection means, and for rejecting the sole electrical effect of second detection means.

12. A well logging radiation detection means adapted to produce an electrical effect in response only to penetrative radiation emanating from a preselected area of said well bore wall the combination of; a first penetrative radiation detection means including a liquid scintillating material for creating an electrical effect in response to penetrative radiation; a second penetrative radiation detection means including a liquid scintillating material substantially enclosing said first detection means for creating an electrical effect in response to penetrative radiation; said second detection means including a radiation transmitting window defined in said second detection means for providing a non-responsive directional path through said second detection means for penetrative radiation emanating from said well bore wall and directed to said first detection means; and an electrical selection means adapted to select the single electrical effect of said first detection means, to reject concurrent electrical effects of both said detection means, and to reject the single electrical effect of said second detection means.

References Cited in the file of this patent
UNITED STATES PATENTS

| | | |
|---|---|---|
| 2,711,482 | Goodman | June 21, 1955 |
| 2,739,242 | Armistead | Mar. 20, 1956 |

OTHER REFERENCES

Two-Crystal Gamma-Ray Scintillation Spectrometer, by R. E. Connally, from the Review of Scientific Instruments, vol. 24, No. 6, June 1953, pages 458 and 459.